United States Patent [19]

Kobayashi

[11] Patent Number: 5,369,307

[45] Date of Patent: Nov. 29, 1994

[54] SWITCHING POWER SOURCE

[75] Inventor: Tadashi Kobayashi, Tokyo, Japan

[73] Assignee: NEC Corporation, Japan

[21] Appl. No.: 895,947

[22] Filed: Jun. 9, 1992

[30] Foreign Application Priority Data

Jun. 12, 1991 [JP] Japan .................. 3-166246

[51] Int. Cl.⁵ .................................. H01H 47/00
[52] U.S. Cl. ............................ 307/125; 307/130
[58] Field of Search ............. 307/112, 116, 125, 126, 307/127, 128, 129, 130, 131; 323/222, 289; 363/18, 19, 20, 21, 49, 97

[56] References Cited

U.S. PATENT DOCUMENTS

| 4,172,276 | 10/1979 | Kameya | 363/19 |
| 4,630,186 | 12/1986 | Kudo | 363/19 |
| 4,862,338 | 8/1989 | Tanaka | 363/19 |

FOREIGN PATENT DOCUMENTS

| 56-17693 | 8/1982 | Japan . |
| 62-27155 | 8/1989 | Japan . |
| 03-166246 | 12/1992 | Japan . |

Primary Examiner—Jeffrey A. Gaffin
Attorney, Agent, or Firm—Laff, Whitesel, Conte & Saret

[57] ABSTRACT

A switching power source applicable to an electronic apparatus and capable of stabilizing an output voltage with a high transform efficiency even when an input voltage varies over a broad range. The output voltage is controlled at the primary circuit side of the power source. The base current is maintained constant with no regard to the input voltage.

6 Claims, 3 Drawing Sheets

SWITCHING POWER SOURCE

BACKGROUND OF THE INVENTION

The present invention relates to a switching power source applicable to various kinds of electronic apparatuses as a stabilizing power source and, more particularly, to a switching power source capable of stabilizing an output voltage with a high transform efficiency even when an input voltage varies over a broad range.

A switching power source is extensively used with electric and electronic apparatuses since it is small size, light weight, and highly efficient. A switching power source has customarily been made up a transformer, a main transistor, and a control circuit. The transformer has a primary winding and a control winding on the primary side and an output winding on the secondary side. The main transistor is connected between the primary side of the transformer and an input power source. The control circuit controls the base current of the main transistor. In operation, when the main transistor is turned off, an output current is produced while the negative voltage on the control winding of the transformer is rectified to generate a negative voltage. The negative voltage is compared with a reference voltage. The base current of the main transistor is so controlled as to equalize the negative voltage and the reference voltage, whereby the output voltage is stabilized. Since a switching circuit generally has to operate without errors over a range of input voltages of 80 V to 270 V, constants insuring the necessary base current even when the input voltage is 80 V are selected.

In the conventional switching power source described above, a current proportional to the input voltage flows from the control winding to the base of the main transistor. This gives rise to a problem that when the input voltage is 270 V, a current more than three times as great as the necessary base current flows. The current more than necessary is simply consumed by the control circuit and base resistance, degrading the efficiency of the power source.

SUMMARY OF THE INVENTION

It is therefore an object of the present invention to provide a simple and efficient switching power source.

It is another object of the present invention to provide a switching power source which stabilizes the output voltage at the primary circuit side and maintains the base current constant with no regard to the input voltage.

A switching power source for transforming an input voltage from an input power source of the present invention has a transformer made up of a primary winding, a control winding, and at least one output winding. A switching device is connected between the primary winding of the transformer and the input power source. A base drive circuit has a base drive capacitor connected to the base of the switching device for storing, when the switching device is in an OFF state, an output voltage appearing on the control winding of the transformer in the base drive capacitor and applying, when the switching device is in an ON state, a charge stored in the base drive capacitor to the base of the switching device to thereby maintain the switching device in the ON state. A base control circuit changes the state of the switching device from ON to OFF. A voltage detection circuit detects a voltage of the base drive capacitor for feeding a corresponding control signal to the base control circuit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
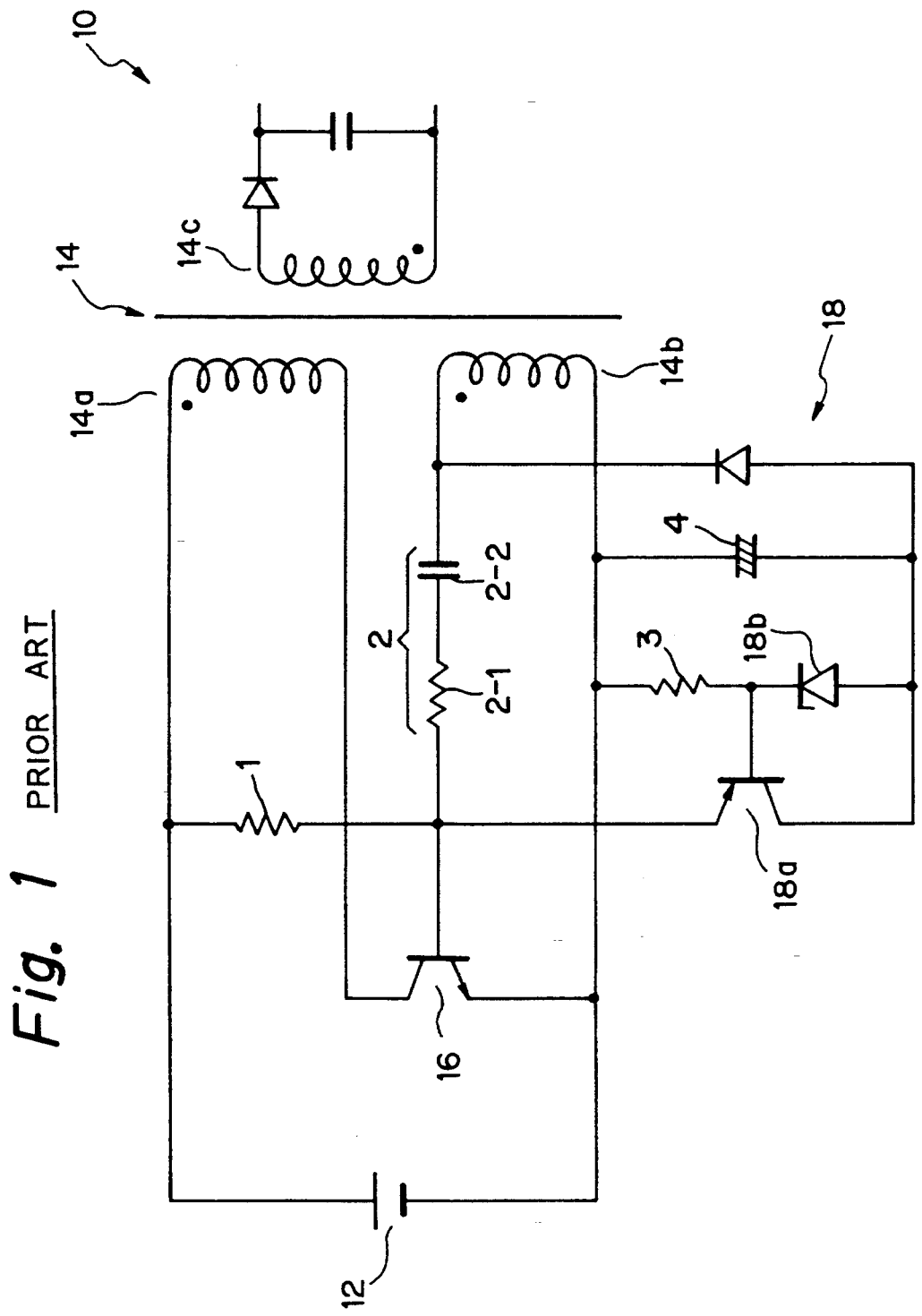
FIG. 1 is a circuit diagram showing a conventional switching power source.

To better understand the present invention, a brief reference will be made to a prior art switching power source, shown in FIG. 1. As shown, the switching power source, generally 10, has a transformer 14 connected to an input power source 12. The transformer 14 has a primary winding 14a and a control winding 14b on the primary side and an output winding 14c on the secondary side. A main transistor 16 is connected between the transformer 14 and the input power source 12 via a resistor 1 which causes transistor 16 to start up. A control circuit 18 includes a transistor 18a and a Zener diode 18b for controlling the base current of the main transistor 16. Resistor 2-1 and capacitor 2-2 limit current and provide AC coupling in order to form a transistor drive circuit. The capacitor 4 functions as a voltage source for transistor 18a, Zener diode 18b. Resistor 3 provides bias and controls base current.

In operation, when the main transistor 16 is turned off, an output current is produced while the negative voltage of the control winding 14b of the transformer 14 is rectified to generate a negative voltage. The negative voltage is compared with a reference voltage. The base current of the main transistor 16 is so controlled as to equalize the negative voltage and the reference voltage, whereby the output voltage is stabilized. Since a switching circuit generally has to operate without errors over a range of input voltages of 80 V to 270 V, constants insuring the necessary base current even when the input voltage is 80 V are selected.

In the conventional switching power source 10, a current proportional to the input voltage flows from the control winding 14b to the base of the main transistor 16. This gives rise to a problem that when the input voltage is 270 V, a current more than three times as great as the necessary base current flows. The current more than necessary is simply consumed by the control circuit 18 and base resistance, degrading the efficiency of the power source.

Preferred embodiments of the power source switching circuit in accordance with the present invention will be described hereinafter with reference to FIGS. 2 and 3. In these figures, the same or similar elements to the elements of the conventional switching power source 10 are designated by the same reference numerals.

Figure 2:
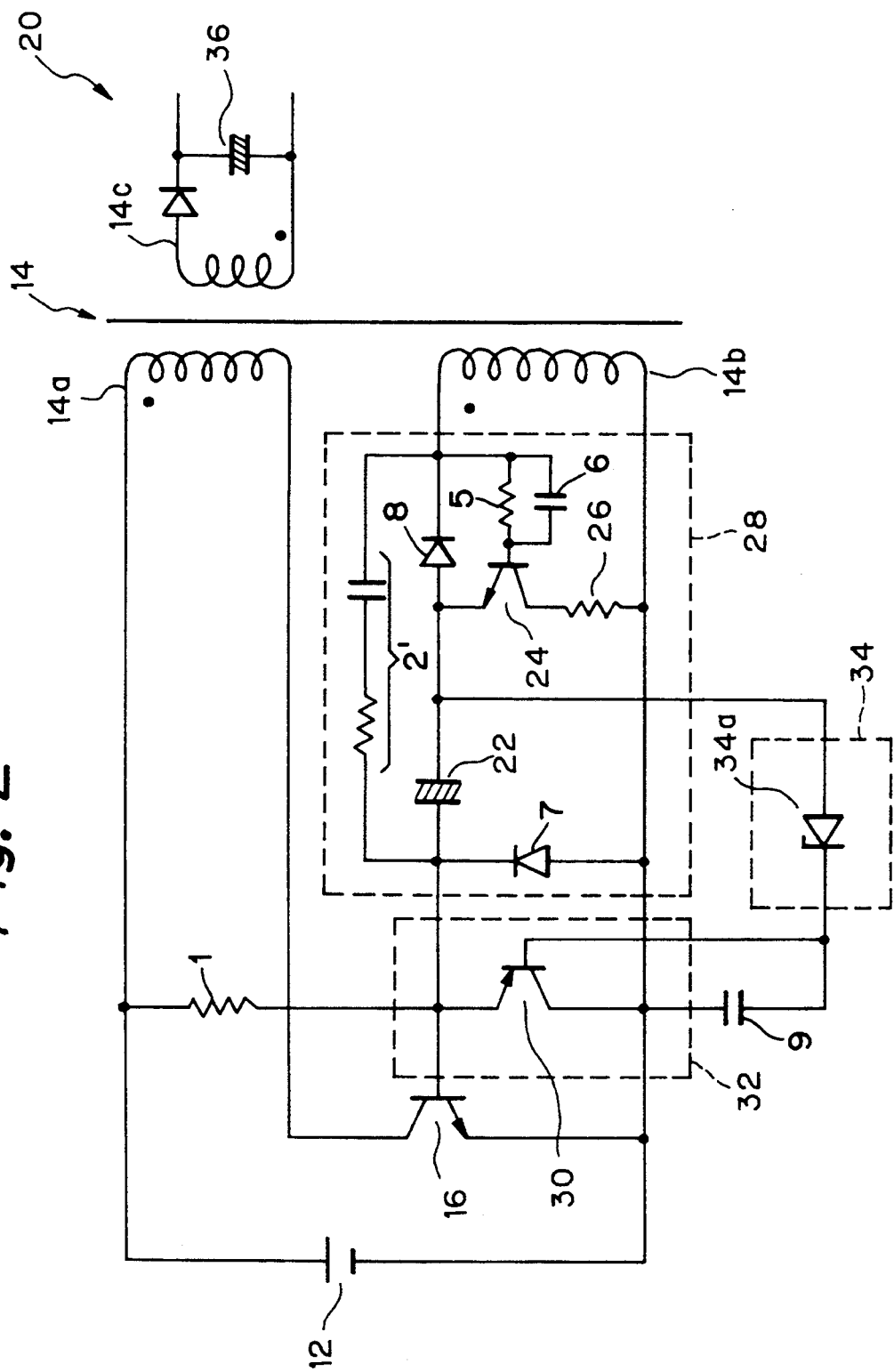
FIG. 2 is a circuit diagram showing a preferred embodiment of the switching power source in accordance with the present invention.

Referring to FIG. 2, a trigger circuit acts when transistor 16 switches from off to on, and then the AC impedance is greater than that of serial connection of resistor and capacitor 2, a switching power source embodying the present invention is shown and generally designated by the reference numeral 20. As shown, the switching power source 20 has a transformer 14 made up of a primary winding 14a, a control winding 14b, and at least one output winding 14c which are magnetically coupled to one another. The primary winding 14a and a main transistor 16 are connected in series and connected to an input power source 12 together. When the main transistor 16 is turned off, an output current is produced from the output winding 14c. A base drive circuit 28 has a base drive capacitor 22, a transistor 24, and a resistor 26. Resistor 5 provide a drive for transistor 24, and capacitor 6 speeds the drive. Diode 7 controls the polarity of current for charging the capacitor 22, which is a voltage source for the transistor 16 drive circuit. Diode 8 provides a forward bias for the base-emitter circuit of transistor 24. When the main transistor 16 is in an OFF state, the output of the control winding 14b is stored in the base drive capacitor 22. When the main transistor 16 is in an OFF state, the charge is applied from the base drive capacitor 22 to the base of the transistor 16 via the resistor 26, thereby maintaining the transistor 16 in the ON state. A base control circuit 32 serves to change the state of the main transistor 16 from ON to OFF and is implemented by a transistor 30. Capacitor 9 reduces noise and promotes stable operation in the base-collector circuit of transistor 30. A voltage detection circuit 34 has a Zener diode 34a and detects the voltage of the base drive capacitor 22 to feed a corresponding control signal to the base control circuit 32. The reference numeral 36 designates an output capacitor.

In operation, when the voltage across the base drive capacitor 22 is higher than a predetermined reference voltage set in the voltage detection circuit 34, the transistor 30 of the base control circuit 32 is turned on with the result that the base current to the main transistor 16 is bypassed and, therefore, reduced. Consequently, the collector current of the main transistor 16 is limited by a current which is hfe (current amplification factor of the main transistor 16) times as great as the base current. Then, a counter electromotive force is generated in the control winding 14b to sharply inversely biases the main transistor 16 while charging the base drive capacitor 22 and output capacitor 36 to a constant voltage. In this manner, the voltage across the base drive capacitor 22 and, therefore, the output voltage on the secondary side of the transformer 14 is maintained constant.

On the other hand, when the main transistor 16 is turned on, the base current remains constant with no regard to the voltage of the input power source 12 since the base drive capacitor 22 is connected to the base of the transistor 16 via the transistor 24 and resistor 26 as a power source. More specifically, the base current of the main transistor 16 is prevented from increasing with the increase in the voltage of the input power source 12.

Figure 3:
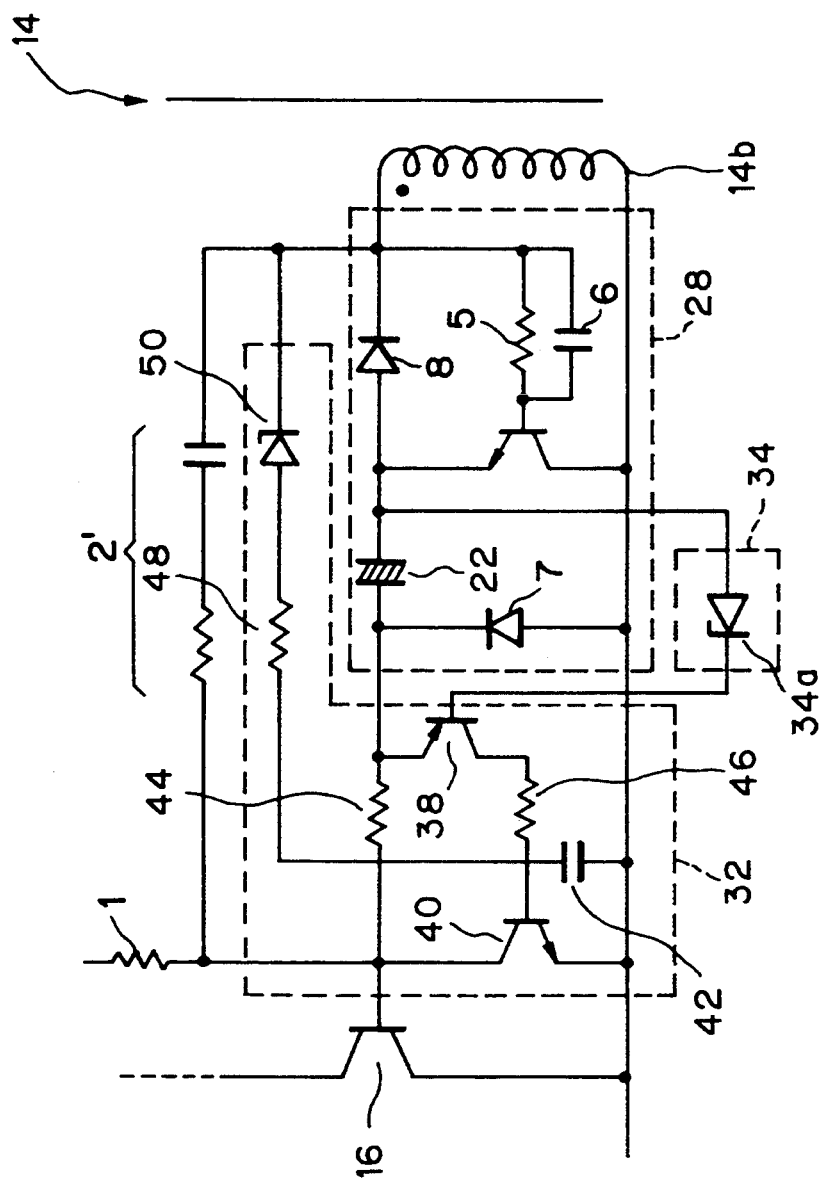
FIG. 3 is a circuit diagram showing an alternative embodiment of the present invention.

FIG. 3 shows the essential part of an alternative embodiment of the present invention. The same reference numerals designate the same parts in FIGS. 2, 3. As shown, the switching power source has transistors 38 and 40, a capacitor 42, resistors 44, 46 and 48, and a Zener diode 34a which, in combination, constitute the base control circuit 32 for turning off the main transistor 16. The rest of the construction is identical with the previous embodiment. In operation, as the voltage across the base drive capacitor 22 exceeds the reference voltage of the voltage detection circuit 34, the transistors 38 and 40 are sequentially turned on in this order. As a result, the base current of the main transistor 16 is sharply bypassed to reverse the main transistor 16 rapidly, insuring an efficiency even higher than the efficiency attainable with the previous embodiment.

In summary, it will be seen that the present invention provides a simple and efficient switching power source which maintains the output voltage constant at the primary circuit side and maintains the base current constant with no regard to the input voltage.

Various modifications will become possible for those skilled in the art after receiving the teachings of the present disclosure without departing from the scope thereof. For example, the Zener diode 34a implementing the voltage detection circuit 34 may be replaced with a shunt regulator, if desired. Also, the main transistor 16 may be constituted by a field effect transistor.

What is claimed is:

1. A switching power source for controlling an input voltage from an input power source, comprising:
    a transformer comprising a primary winding, a control winding, and at least one output winding;
    a switching device connected between the primary winding of said transformer and the input power source;
    a base drive circuit comprising a base drive capacitor connected to a base of said switching device for storing a charge in response to an output voltage appearing on the control winding of said transformer, said charges being stored in said base drive capacitor when said switching device is in an OFF state, and for applying said charge stored in said base drive capacitor to the base of said switching device when said switching device is in ON state for maintaining said switching device in the ON state;
    a base control circuit for changing the state of said switching device from ON to OFF; and
    a voltage detection circuit for detecting a voltage of said base drive capacitor and for feeding a corresponding control signal to said base control circuit.

2. A switching power source as claimed in claim 1, wherein said switching device comprises a transistor.

3. A switching power source as claimed in claim 1, wherein said switching device comprises a field effect transistor.

4. A switching power source as claimed in claim 1, wherein said base drive circuit comprises a transistor.

5. A switching power source as claimed in claim 1, wherein said voltage detection circuit comprises a Zener diode.

6. A switching power source as claimed in claim 1, wherein said voltage detection circuit comprises a shunt regulator.

* * * * *